(12) United States Patent
Grossman et al.

(10) Patent No.: US 8,814,132 B2
(45) Date of Patent: Aug. 26, 2014

(54) METHOD FOR REGULATING AN ACTUAL VARIABLE TO A SETPOINT VARIABLE

(75) Inventors: Alex Grossman, Leonberg (DE); Mattias Hallor, Markgroeningen (DE); Soenke Mannal, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1071 days.

(21) Appl. No.: 12/221,341

(22) Filed: Aug. 1, 2008

(65) Prior Publication Data

US 2009/0078897 A1 Mar. 26, 2009

(30) Foreign Application Priority Data

Sep. 20, 2007 (DE) .......................... 10 2007 044 809

(51) Int. Cl.
*F16K 31/04* (2006.01)
*G05D 7/06* (2006.01)
*G05D 3/12* (2006.01)

(52) U.S. Cl.
USPC .................... 251/129.04; 251/129.1; 700/282

(58) Field of Classification Search
USPC ............. 251/129.01, 129.04, 129.11; 70/282; 700/282
See application file for complete search history.

(56) References Cited

U.S. PATENT DOCUMENTS

| | | | |
|---|---|---|---|
| 5,950,668 A * | 9/1999 | Baumann | 137/487.5 |
| 6,041,264 A * | 3/2000 | Wruck et al. | 700/40 |
| 6,286,532 B1 * | 9/2001 | van Nieuwstadt et al. | 137/1 |
| 6,698,408 B2 * | 3/2004 | McConnell | 123/568.21 |
| 2005/0092949 A1 * | 5/2005 | Wilhelm et al. | 251/129.04 |
| 2007/0088446 A1 * | 4/2007 | Srinivasan et al. | 700/32 |

* cited by examiner

*Primary Examiner* — Eric Keasel
*Assistant Examiner* — Jonathan Waddy
(74) *Attorney, Agent, or Firm* — Kenyon & Kenyon LLP

(57) ABSTRACT

A method for regulating an actual variable (X) to a setpoint variable (W), a manipulated variable (Y) being ascertained from the setpoint variable (W) and the actual variable (X), and the manipulated variable being supplied to an input of a controlled system, and a change in the actual variable (X) occurring only upon the manipulated variable being changed by a minimum amount, an intermediary manipulated variable (Y'), to which a correcting quantity (K) is applied in the steady-state condition of the regulation for forming the manipulated variable (Y), being first ascertained from the setpoint variable (W) and the actual variable (X), only values which change the manipulated variable (Y) by less than a minimum amount being allowed for the correcting quantity (K).

20 Claims, 3 Drawing Sheets

METHOD FOR REGULATING AN ACTUAL VARIABLE TO A SETPOINT VARIABLE

FIELD OF THE INVENTION

The present invention relates to a method and a regulating device for regulating an actual variable to a setpoint variable, a manipulated variable being ascertained from the setpoint variable and the actual variable and the manipulated variable being supplied to an input of a controlled system, and a change in the actual variable occurring only upon the manipulated variable being changed by a minimum amount.

BACKGROUND INFORMATION

For regulating electrically controlled actuators such as a throttle valve, a charge-motion valve, an exhaust gas recirculation valve, a bypass valve for a compressor, a general purpose actuator, and the like in motor vehicles, digital regulation via a control unit is often used. Conventional regulation strategies such as PID, LQ, IMC, and the like maintain the control signal for the manipulated variable constant in the case of a corrected setpoint-actual difference.

In the case of static friction-dominated controlled systems, a minimum force or a minimum torque is needed to overcome the static friction (break loose). A movement of the actuator thus only occurs if the manipulated variable is sufficient for overcoming the static friction. If the manipulated variable is less than needed for overcoming the static friction, the valve or the like is not displaced; current is then applied to an actuator such as an electric motor without any displacement occurring, since the static friction is not overcome.

SUMMARY OF THE INVENTION

An object of the exemplary embodiments and/or exemplary methods of the present invention is to reduce long-lasting application of force or power to a non-moving actuator or controller.

This object is achieved by a method for regulating an actual variable to a setpoint variable, a manipulated variable being ascertained from the setpoint variable and the actual variable and the manipulated variable being supplied to an input of a controlled system, and a change of the actual variable occurring only upon the manipulated variable being changed by a minimum amount, an intermediary manipulated variable being first ascertained from the setpoint variable and the actual variable, to which a correcting quantity is applied in a steady-state condition of the regulation for forming the manipulated variable, only values which modify the manipulated variable by less than the minimum amount being allowed for the correcting quantity. The correcting quantity may be zero in a non-steady state condition of the controller.

In a non-steady state condition in which the actual variable is regulated to the setpoint variable, the manipulated variable is not modified by a correcting value. The regulating behavior is thus not affected outside the steady-state condition. A steady-state condition is understood here as an almost steady-state condition in which therefore a change in the variable is technically measurable, but is not relevant for the application. The intermediary manipulated variable may be provided by essentially known controllers and are processed only thereafter according to the exemplary embodiments and/or exemplary methods of the present invention. The intermediary manipulated variable may be a pulse-width-modulated signal, and the correcting quantity may be a pulse-width ratio, the pulse-width ratio of the intermediary manipulated variable being modified by adjusting the pulse-width ratio, or the correcting quantity for forming the manipulated variable.

The steady-state condition of the regulation may include a constant actual variable and/or a constant setpoint variable and/or a constant manipulated variable. Constant is to be understood here in such a way that the values do not change or they change only within a range due to measurement accuracy, and the time gradient of the variables is thus approximately zero or becomes zero.

The correcting quantity may be limited to a constant maximum amount, which is ascertained from a static friction component of the controlled system. The maximum amount thus reflects the maximum allowable change in the manipulated variable between the two points at which the static friction is barely acting. The correcting quantity may be selected in such a way that the difference between the manipulated variable and the actual variable does not exceed a maximum amount. The maximum amount reflects the maximum force or maximum torque applicable in one direction, above which breaking loose occurs, i.e., the static friction is overcome.

It may be provided that, in the event of a change in the manipulated variable, a change in the actual variable only occurs when the manipulated variable drops below a lower limiting value or when it exceeds an upper limiting value and that the correcting quantity is selected in such a way that the manipulated variable remains within the limits formed by the lower and upper limiting values. The correcting quantity may thus be greater than the lower limiting value and/or smaller than the upper limiting value.

The correcting quantity may be constant or is a function of the operating point. In the first case, the correcting quantity may be easily stored in a control unit as a single piece of information; the constant must then apply to the entire operating range. In the second case, the correcting quantity may be better adjusted to the particular conditions at an operating point. In the case where the correcting quantity is a function of the operating point, it may be taken from an operating point-dependent characteristics map or an operating point-dependent function. The specific constants or the characteristics map or function may be determined empirically.

The above-mentioned object is also achieved by a regulating device for regulating an actual variable to a setpoint variable, a manipulated variable being ascertained from the setpoint variable and the actual variable and the manipulated variable being supplied to an input of a controlled system, and a change of the actual variable occurring only upon the manipulated variable being changed by a minimum amount, an intermediary variable being first ascertained from the setpoint variable and the actual variable, to which a correcting quantity is applied in a steady-state condition of the regulation for forming the manipulated variable, only values which modify the manipulated variable by less than the minimum amount being allowed for the correcting quantity.

The above-named object is also achieved via a computer program having program code for carrying out all steps of a method according to the present invention when the program is executed on a computer.

An exemplary embodiment of the present invention is elucidated below in greater detail with reference to the appended drawings.

DETAILED DESCRIPTION

Figure 1:
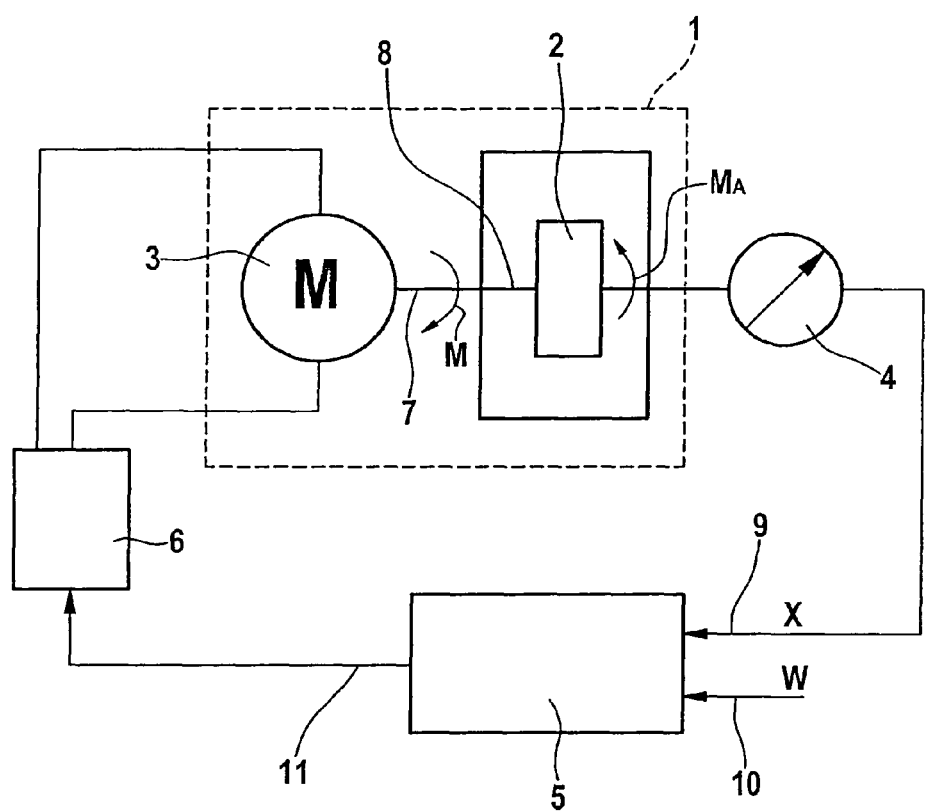
FIG. 1 shows a schematic drawing of a regulating circuit according to the present invention.

FIG. 1 shows an exemplary embodiment of a regulation using the example of a controlled system 1 which includes a charge-motion valve 2 as an actuating element and an electric drive 3 as an actuator and an angulometer 4 as a measuring device. Actual variable X as a pulse-width-modulated electrical signal appears at the output of angulometer 4 used as a measuring device. Manipulated variable Y appears at an output 11. Actual variable X is supplied to a first input 9 of a controller 5; furthermore, a reference variable W is supplied to a second input 10 of controller 5. Reference variable W is an electrical variable which predefines a setpoint value for the angular position of charge-motion valve 2. Reference variable W, like actual variable X, is a pulse-width-modulated signal. Actual variable X represents actual angular position $\Phi_{actual}$ of charge-motion valve 2. Reference variable W represents setpoint angular position $\Phi_{setpoint}$ of charge-motion valve 2. The controller regulates actual angular position $\Phi_{actual}$ of charge-motion valve 2 to setpoint angular position $\Phi_{setpoint}$. For this purpose, an input of an output stage 6 receives a pulse-width modulated manipulated variable Y. At an output of output stage 6 an output voltage $U_M$ appears, which is supplied to electric drive 3. An output shaft 7 of electric drive 3 is non-rotatably connected to a bearing shaft 8 of charge-motion valve 2. Actual angular position $\Phi_{actual}$ of charge-motion valve 2 is a function of drive torque M at output shaft 7, which is a function of output voltage $U_M$ and thus of pulse-width ratio PW of manipulated variable Y.

The bearings of bearing shaft 8 and of output shaft 7 of electric drive 3 are subject to friction, static friction occurring here in addition to sliding friction. Static friction means that a break-loose torque M_L must first be overcome for a movement of charge-motion valve 2 to occur. If charge-motion valve 2 receives an external torque M_A, it remains in its current actual angular position $\Phi_{actual}$ as long as the absolute value of the difference between the external torque M_A and drive torque M is less than break-loose torque M_L, i.e., when |M−M_A|<M_L.

In the case of steady-state regulation, charge-motion valve 2 is in a defined, constant angular position $\Phi_{actual}$ which is thus unchanged over time. From the point of view of the controller, steady-state regulation means that actual variable X, reference variable W, and manipulated variable Y are constant, i.e., unchanged over time. In a steady-state and thus corrected controller, manipulated variable Y has a defined duty factor, whereby a corresponding output voltage $U_m$ is applied to output stage 6, which generates a corresponding torque M of output shaft 7 of electric drive 3. In the corrected state, this torque M is exactly equal to external torque M_A applied to charge-motion valve 2. The external torque is composed of a restoring torque due to the flow around charge-motion valve 2 and the torque of a restoring spring. In the case of a highly pre-stressed restoring spring, for which the path or, in the case of a torsion spring, the angle used in operation is small compared to the pre-stress path, the restoring force or restoring torque is virtually constant across the path or angle used in operation. The application of torque M by electric drive 3 results in electric drive 3 generating a corresponding power loss $P_v$ over an extended period. If torque M of electric drive 3 is reduced to a value M=M_L−M_A or increased to a value M=M_L+M_A, no motion of charge-motion valve 2 occurs. In the event of a reduction of torque M to the value M=M_L−M_A, however, power loss $P_v$ generated by the electric drive is reduced. It is therefore provided according to the exemplary embodiments and/or exemplary methods of the present invention that torque M of electric drive 3 is reduced to the value M=M_L−M_A if possible in steady-state condition of the regulations, in particular in a steady-state (non-moving) condition of charge-motion valve 2. For this purpose, manipulated variable Y is modified as appropriate; in the present case of a pulse-width modulated control, pulse-width ratio PW of manipulated variable Y is modified.

Figure 2:
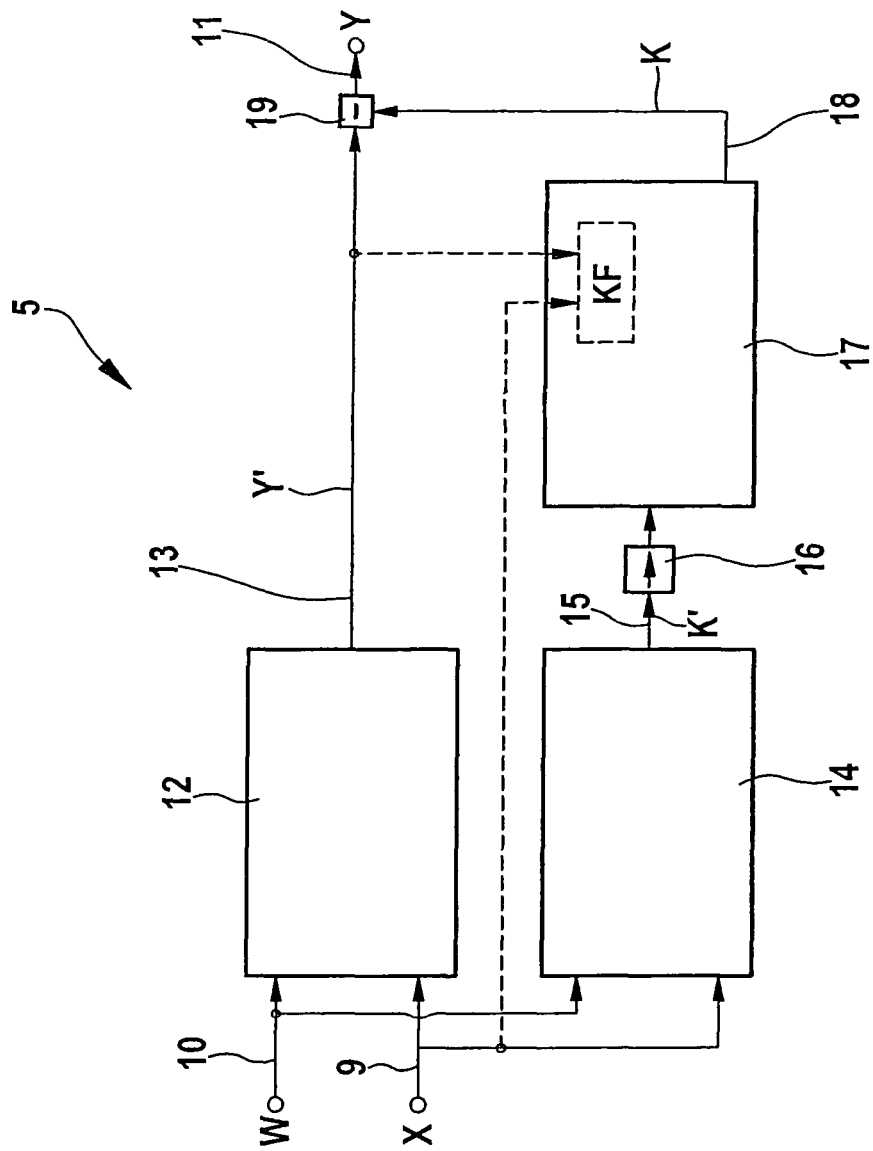
FIG. 2 shows a schematic drawing of a controller according to the present invention.

FIG. 2 shows the schematic drawing of an exemplary embodiment of controller 5 according to FIG. 1. FIG. 2 shows input 9 having actual variable X supplied, input 10 having reference variable W supplied, and output 11 having manipulated variable Y. Input variable X and reference variable W are applied to an input of a controller 12, at whose output 13 an intermediary manipulated variable Y' appears. Controller 12 includes, for example, a comparator element not shown here, which forms a control difference e=W−X and supplies this difference to an essentially known PID, LQ, IMC, CRONE controller or the like, whose output is connected to output 13. A controller of this type is essentially known. Parallel to controller 12, actual variable X and reference variable W are supplied to a control element 14. Using control element 14, it is established whether setpoint reference variable W and/or actual variable X are constant. For this purpose, both variables may be supplied to a differentiator, for example, whose output signal is checked by a comparator to verify whether the gradient is less than a threshold value S, becoming zero if possible. Instead of differentiation, a difference calculation may also be performed, in which consecutive values are subtracted from each other and constancy is assumed when this difference is less than a limiting value S. If this is the case, the particular signal is constant. If one signal is, or in the present exemplary embodiment both signals are, constant, a value K' appears at an output 15 of control element 6 and is checked in a checking unit 16 as to whether it is different from zero. If value K' is different from zero, this means that actual variable X and reference variable W are constant, and value 1 appears at the output of checking unit 16; if one of the two values actual variable X or reference variable W is not constant, value 0 appears at the output of checking unit 16. The output of checking unit 16 is connected to a computing unit 17, at whose output 18 value K appears. In the non-constant case, value K is equal to zero; therefore, value K equal to zero appears at output 18 if value zero is supplied to the input of computing unit 17, i.e., when one of the two values actual variable X or reference variable W is non-constant. If value 1 is applied to the input of computing unit 17, i.e., both actual variable X and reference variable W are constant, a value different from zero of correcting quantity K appears at output 18.

Correcting quantity K different from zero is selected in such a way that manipulated variable Y is reduced just so much that no motion of charge-motion valve 2 occurs. Correcting quantity K is ascertained on the basis of manipulated variable Y and/or actual variable X. In the simplest case, correcting quantity K is ascertained on the basis of manipulated variable Y. In the case of a system with a large static friction component and almost constant external torque, i.e., in the present exemplary embodiment a charge-motion valve 2 mounted with a large static friction using a highly pre-stressed restoring spring as explained previously, the static friction component of the holding torque may be estimated from manipulated variable Y alone by defining a corridor for manipulated variable Y, within which no movement of the charge-motion valve occurs. Correcting quantity K is now selected in such a way that manipulated variable Y remains within this corridor. When manipulated variable Y changes, actual variable X does not change until the manipulated variable Y drops below a lower limiting value or exceeds an upper limiting value. Correcting quantity K is now selected in such a way that manipulated variable Y remains within the limits formed by the lower and upper limiting values, i.e., is larger than the lower limiting value and smaller than the upper limiting value. For example, if charge-motion valve 2 remains at rest for a pulse-width ratio of between 20% and 40% and the current pulse-width ratio of the intermediary manipulated variable is 35%, the correcting quantity may assume a maximum value of just below 15%, so that Y=Y'−K, i.e., here Y=35%−15%=20%. Alternatively, correcting quantity K may be a function of the operating point, i.e., in the exemplary embodiment of FIG. 1 of the actual angular position $\Phi_{actual}$ of charge-motion valve 2, and of intermediary manipulated variable Y' or manipulated variable Y. The functional relationship may be taken into account in different ways, for example, values of correcting quantity K may be taken from a characteristics map KF as a function of actual variable X and intermediary manipulated variable Y', i.e., in the form of a characteristics map K=KF(X, Y'). The static friction expressed in a pulse-width ratio may be constant, i.e., independent of the actual variable, but may also be a function of the operating point. In the first case, the static friction determines the maximum difference between actual variable X and manipulated variable Y, which must be less than a static friction recalculated to a pulse-width ratio. In the second case, the static friction value and thus the allowable difference between actual variable X and manipulated variable Y is a function of actual variable X. Characteristics map KF is illustrated in FIG. 2 by a shaded box, at whose input actual variable X and intermediary manipulated variable Y' are applied, and from which a value for correcting quantity K is taken. Instead of a characteristics map KF, a functional relationship K=f(X, Y') for the value of correcting quantity K as a function, for example, of actual variable X and intermediary manipulated variable Y', may also be stored here. It is also possible to assume a constant for correction value K. Correction value K is such that manipulated variable Y changes over the entire available operating range of actual variable X in such a way that torque M appearing at the output of electric drive 3 does not change more due to the change in manipulated variable Y than break-loose torque M_L. By applying correcting quantity K, torque M is modified only to the point where no movement of charge-motion valve 2 occurs. Correcting quantity K is subtracted from intermediary manipulated variable Y' using a subtractor 19, so that manipulated variable Y appears at output 11.

In the corrected state, after a dynamic regulation operation has been completed, torque M appearing at the output of the electric drive will assume a value between M=M_L−M_A and M=M_A+M_L. The value assumed by M between these two limits is more or less random; in the case of a PID controller the value is a function of variation of the integral (I)component of the PID controller. Without considering output signal Y', it is then impossible to say to what point the output signal may be reduced without charge-motion valve 2 moving. The correcting quantity is therefore limited in another exemplary embodiment in such a way that manipulated variable Y does not drop below a predefined minimum value. The predefined minimum value is determined in such a way that torque M does not become less than M=M_L−M_A. Subsequently an example of M=M_L−M_A, where numerical values are given as pulse-width ratio in percent, i.e., for K=15, the minimum value for Y is 20. In that case, Y is selected as Y=max(20, Y'−15). In addition, the value of correcting quantity K may be limited, for example, to a pulse-width ratio corresponding to twice the static friction value. Greater values for K must necessarily result in a movement of the charge-motion valve.

In this case, if correcting quantity K is selected to be large, the minimum value Y=20 is almost always obtained for manipulated variable Y (M=M_A−M_L); however, this is not the case when output signal Y' has been set at a high value, for example, when the controller must output a high duty factor of intermediary manipulated variable Y' due too a weak (hot) electric drive, to generate a sufficient torque M. In that case correcting quantity K ensures that manipulated variable Y is not reduced excessively. In other words, "reduce always 15%, but not below 20%" means exactly the same as "reduce always to 20%, but not more than 15%."

Alternatively, correcting quantity K may be reduced without regard for intermediary manipulated variable Y' or manipulated variable Y as a constant with the effect that if torque M obtained as a result is insufficient for keeping charge-motion valve 2 stationary, the position controller must intervene again.

The data for characteristics map KF or the corridor in which manipulated variable Y should be in the steady-state case are ascertained empirically. Of course, the regulation according to the exemplary embodiments and/or exemplary methods of the present invention may be used not only for a charge-motion valve, but for any case of a controlled system subject to static friction whether static friction occurs by mechanical rotation or translation, or results from electrical or other physical variables.

Figure 3:
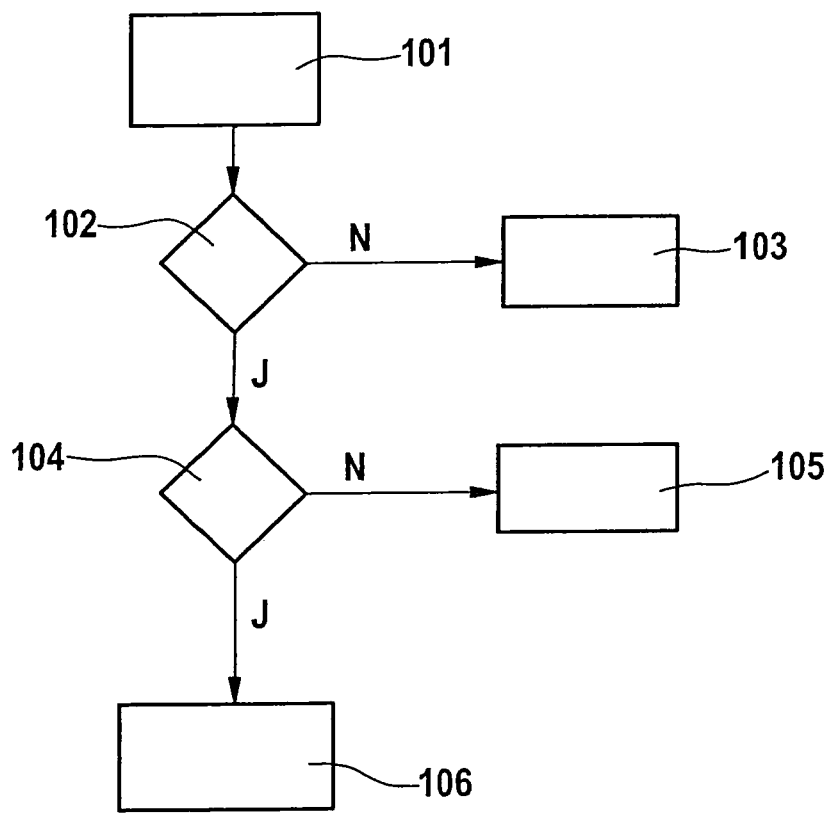
FIG. 3 shows a flow chart of a method according to the present invention.

FIG. 3 shows a flow chart of an exemplary embodiment of a method according to the present invention. In this exemplary embodiment, it is assumed that both actual variable X and reference variable W must be constant for a correction factor K different from zero to be applied. Alternatively, the method may also easily be configured in such a way that only one or another combination of the variables actual variable X, reference variable W and/or manipulated variable Y must be constant. The method starts in a start block 101. A check is made in a step 102 of whether actual variable X is constant. If this is not the case, which is indicated by option N, the process branches off to a step 103 and correcting quantity K is set to zero. If the check in step 102 results in that actual variable X is constant, indicated by option J, a check is made in a step 104 of whether reference variable W is constant.

If this is not the case, which is indicated by option N, the process branches off into a step 105 and correcting quantity K is set to zero. If the check in step 104 results in that reference variable W is constant, indicated by option J, both actual variable X, as checked in step 102, and also reference variable W are constant. In this case, the program branches off to a step 106 and correcting quantity K is switched to a constant or operating point-dependent value as explained previously. The method is then run through again starting with step 101.

What is claimed is:

1. A computer-implemented method for reducing one of an application of power and force to an actuator having an actual variable and a setpoint variable, the method comprising:
first ascertaining, with a controller having a processor, an intermediary variable from the setpoint variable and the actual variable;
determining, with a measuring device and the controller, a status of the actual variable of the actuator and a status of the setpoint variable;
generating, with the controller, a correcting quantity if the actual variable of the actuator and the setpoint variable are determined substantially constant;

in a steady-state condition of regulation, applying, with the controller, to the intermediary variable, the correcting quantity to form a manipulated variable, wherein only values of the correcting quantity, which change the intermediary variable to produce a manipulated variable that is less than a predetermined amount, are allowed, wherein the predetermined amount is selected such that the formed manipulated variable stays within a range within which no change of the actual variable of the actuator occurs, and wherein the correcting quantity is determined based on one of (i) a characteristic map of the intermediary variable and the actual variable, (ii) a function of the intermediary variable and the actual variable, and (iii) a constant value for the correcting quantity; and supplying the manipulated variable to an input of the actuator, wherein a change in the actual variable occurs upon the manipulated variable being above the predetermined amount;

wherein the controller is connected to a valve via the measuring device to receive the actual variable, and is connected to an output stage, which is connected to the actuator, which is connected to the valve to actuate the valve, the controller also having an input to receive the setpoint variable.

2. The method of claim 1, wherein the steady-state condition of regulation includes at least one of a constant actual variable, a constant setpoint variable, and a constant manipulated variable.

3. The method of claim 1, wherein the correcting quantity is limited to a maximum amount.

4. The method of claim 1, wherein the correcting quantity is selected so that a difference between the manipulated variable and the actual variable does not exceed a maximum amount.

5. The method of claim 1, wherein, in the event of a change in the manipulated variable, a change in the actual variable only occurs upon one of (i) the manipulated variable dropping below a lower limiting value, and (ii) upon exceeding an upper limiting value, and wherein the correcting quantity is selected so that the manipulated variable remains within limits formed by the lower limiting value and the upper limiting value, wherein the upper limiting value is the predetermined amount.

6. The method of claim 5, wherein the correcting quantity is selected so that the manipulated variable is greater than the lower limiting value.

7. The method of claim 5, wherein the correcting quantity is selected so that the manipulated variable is less than the upper limiting value.

8. The method of claim 5, wherein the correcting quantity is constant.

9. The method of claim 5, wherein the correcting quantity is a function of an operating point.

10. The method of claim 9, wherein the correcting quantity is taken from one of an operating point-dependent characteristics map and the function of the operating point.

11. A regulating device for reducing one of an application of power and force to an actuator having an actual variable and a setpoint variable, comprising:

a controller, connected to a valve via a measuring device, to receive the actual variable, and connected to an output stage, which is connected to the actuator, which is connected to the valve to actuate the valve, the controller also having an input to receive the setpoint variable;

a processor, in the controller, configured to:

ascertain an intermediary variable from the setpoint variable and the actual variable, determine, using the measuring device, a status of the actual variable of the actuator and a status of the setpoint variable, generate a correcting quantity if the actual variable of the actuator and the setpoint variable are determined substantially constant, and in a steady-state condition of regulation, applying to the intermediary variable the correcting quantity for forming a manipulated variable, wherein only values of the correcting quantity which change the intermediary variable to produce a manipulated variable that is less than a predetermined amount are allowed, wherein the predetermined amount is selected such that the manipulated variable stays within a range within which no change of the actual variable of the actuator occurs, and wherein the correcting quantity is determined based on one of (1) a characteristic map of the intermediary variable and the actual variable, (2) a function of the intermediary variable and the actual variable and (3) a constant value for the correcting quantity; and the controller to supply the manipulated variable to an input of the actuator, wherein a change in the actual variable occurring upon the manipulated variable being above the predetermined amount.

12. The regulating device of claim 11, wherein the steady-state condition of regulation includes at least one of a constant actual variable, a constant setpoint variable, and a constant manipulated variable.

13. The regulating device of claim 11, wherein the correcting quantity is limited to a maximum amount.

14. The regulating device of claim 11, wherein the correcting quantity is selected so that a difference between the manipulated variable and the actual variable does not exceed a maximum amount.

15. The regulating device of claim 11, wherein, in the event of a change in the manipulated variable, a change in the actual variable only occurs upon one of (i) the manipulated variable dropping below a lower limiting value, and (ii) upon exceeding an upper limiting value, and wherein the correcting quantity is selected so that the manipulated variable remains within limits formed by the lower limiting value and the upper limiting value, wherein the upper limiting value is the predetermined amount.

16. The regulating device of claim 15, wherein the correcting quantity is selected so that the manipulated variable is greater than the lower limiting value.

17. The regulating device of claim 15, wherein the correcting quantity is selected so that the manipulated variable is less than the upper limiting value.

18. The regulating device of claim 15, wherein the correcting quantity is constant.

19. The regulating device of claim 15, wherein the correcting quantity is a function of an operating point.

20. The regulating device of claim 19, wherein the correcting quantity is taken from one of an operating point-dependent characteristics map and the function of the operating point.

* * * * *